Patented June 6, 1939

2,161,332

UNITED STATES PATENT OFFICE 2,161,332

THIAZOLINOTRICARBOCYANINE DYE

Leslie G. S. Brooker, Rochester, N. Y., assignor, by mesne assignments, to Eastman Kodak Company, Jersey City, N. J., a corporation of New Jersey No Drawing. Original application January 16, 1933, Serial No. 651,870. Divided and this application March 3, 1936, Serial No. 66,858

6 Claims. (Cl. 260—240)

This invention relates to cyanine dyes and more particularly to thiazolotricarbocyanine and thiazolinotricarbocyanine dyes.

This application is a division of my copending application Serial No. 651,870, filed January 16, 1933, dealing with a new method for the preparation of cyanine dyes which comprises carrying out cyanine dye condensations in the presence of strong organic basis, i. e., organic bases having a dissociation constant substantially greater than that of pyridine. By my method described in the above-referred to copending application, substantial increases in yields of dyes can be obtained. In fact, my new method allows of the preparation of certain cyanine dyes heretofore unattainable.

It is an object of the instant invention to provide thiazolotricarbocyanine and thiazolinotricarbocyanine dyes. These dyes are particularly useful as sensitizers for photographic emulsions, increasing the range of sensitivity thereof.

I have found that thiazolotricarbocyanines can be prepared by condensing two molecular proportions of a quarternary salt of a 2-methylthiazole base with one molecular proportion of a condensation product of glutaconic aldehyde and a primary or secondary amine, in the presence of a strong organic base, such as triethylamine, piperidine, triethanolamine, n-butylamine, diethylamine, β-diethylaminoethyl alcohol and the like. Guanidine carbonate is also useful. In the presence of these strong organic bases, two molecular proportions of a quaternary salt of a 2-methylthiazoline base can also be condensed with one molecular proportion of glutaconic aldehyde and a primary or secondary amine to give thiazolinotricarbocyanine dyes.

The following examples serve to illustrate the preparation of three of my new dyes. This illustration is not intended, however, to limit my invention in any way except as indicated in the appended claims.

Example 1

3,3'-diethylthiazolinotricarbocyanine iodide 5.1 parts (2 mols.) of 2-methylthiazoline were heated for 4 hours at 100° with 10 parts (2 mols.) of ethyl-p-toluenesulfonate. The yellowish viscous product was used without further purification, being dissolved in 25 parts of ethyl alcohol, the solution well chilled in a freezing mixture, 7 parts (1 mol.) of glutaconic aldehyde dianilide hydrochloride added to the solution followed by 4.3 parts (2 mols.) of piperidine. There was an instant very dark coloration and the whole was stood aside in the ice-box overnight. Crystals of the p-toluenesulfonate of the dye separated on stirring in 70 parts of cold ether. The ethereal layer was poured off and the residue stirred with 40 parts of acetone and filtered. The yield of air-dried dye is around 80%. The dye is then dissolved in hot methyl alcohol (25 parts) and precipitated by adding a solution of excess of potassium iodide (10 parts) in hot water (25 parts). The steely crystals could be crystallized from methyl alcohol in which they dissolved with a deep blue color.

This dye can be represented by the following formula:

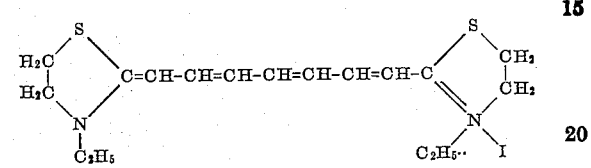

Example 2

3,3'-diethylthiazolotricarbocyanine iodide 2-methylthiazole etho-p-toluenesulfonate is prepared by heating 4 parts (2 mols.) of 2-methylthiazole with 8 parts (2 mols.) of ethyl p-toluenesulfonate for 30 hours at 100°. The product is dissolved in 20 parts of absolute ethyl alcohol, the solution chilled in ice water, 5.6 parts (1 mol.) of glutaconic aldehyde dianilide hydrochloride added and then 3.4 parts (2 mols.) of piperidine. The whole is well shaken and stood in the icebox for about 120 hours. The deep blue liquid is then mixed with an excess of cold aqueous potassium iodide and the dye is precipitated, removed by filtration and washed with water. It is then treated with acetone, in which it dissolves readily, and on standing or on rubbing with a glass rod the dye separates out in beautiful greenish bronze crystals relatively insoluble in the solvent. These crystals were removed and may be recrystallized from methyl alcohol, the color of the solution being deep blue. The dye is then obtained in green needles, some facets of which reflect blue light and others brassy-green light.

This dye can be represented by the following formula:

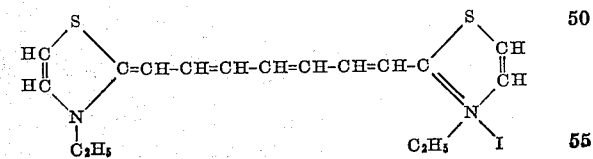

EXAMPLE 3

3,4,3',4'-tetramethylthiazolotricarbocyanine bromide 12 parts (2 mols.) of 2,4-dimethylthiazole metho-p-toluenesulfonate (made by condensing together equimolecular proportions of 2,4-dimethylthiazole and methyl p-toluenesulfonate) are dissolved in 24 parts of hot absolute ethyl alcohol, the solution rapidly chilled in a freezing mixture, 5.6 parts (1 mol.) of glutaconic aldehyde dianilide hydrochloride added, 3.4 parts (2 mols.) of piperidine, the whole well shaken, and stood aside for 6 days at 0–10° C. with occasional shaking. The dye separates out and is removed by filtration at the end of the period, impurities being removed by washing with acetone followed by water. The dye (probably the p-toluenesulfonate) forms a dull green powder which may be recrystallized from methyl alcohol, or, the methyl alcoholic solution may be treated with excess of aqueous potassium bromide, when the bromide of the dye separates out. This may be removed and recrystallized from methyl alcohol and it separates in green lustrous crystals which give a deep blue solution.

In a similar manner, other thiazolinotricarbocyanines and thiazolotricarbocyanines can be prepared. The parent bases may be substituted in the available positions, but this does not affect or diminish the scope of my invention.

What I claim as my invention and desire to be secured by Letters Patent of the United States is:

1. 3,3'-diethylthiazolinotricarbocyanine iodide.
2. A 3,3'-dialkylthiazolinotricarbocyanine salt.
3. A 3,3'-diethylthiazolinotricarbocyanine salt.
4. A 3,3'-dialkylthiazolinotricarbocyanine halide.
5. A 3,3'-diethylthiazolinotricarbocyanine halide.
6. A 3,3'-dialkylthiazolinotricarbocyanine iodide.

LESLIE G. S. BROOKER.